(12) United States Patent
Chang Lee

(10) Patent No.: US 11,263,419 B2
(45) Date of Patent: Mar. 1, 2022

(54) BIOMETRIC ANALYSIS STRUCTURE, METHOD AND NEURAL NETWORK WITH CODED MASK

(71) Applicant: SHANGHAI HARVEST INTELLIGENCE TECHNOLOGY CO., LTD, Shanghai (CN)

(72) Inventor: Ya-Ti Chang Lee, Shanghai (CN)

(*) Notice: Subject to any disclaimer, the term of this patent is extended or adjusted under 35 U.S.C. 154(b) by 62 days.

(21) Appl. No.: 16/708,452

(22) Filed: Dec. 10, 2019

(65) Prior Publication Data

US 2020/0184184 A1 Jun. 11, 2020

(30) Foreign Application Priority Data

Dec. 11, 2018 (CN) .......................... 201811509920.0
Dec. 11, 2018 (CN) .......................... 201811509942.7
Dec. 11, 2018 (CN) .......................... 201811509957.3

(51) Int. Cl.
*G06K 9/00* (2006.01)
*G06N 3/04* (2006.01)
*G06N 3/08* (2006.01)
*G06K 9/62* (2022.01)

(52) U.S. Cl.
CPC ..... *G06K 9/00013* (2013.01); *G06K 9/00067* (2013.01); *G06K 9/6262* (2013.01); *G06N 3/04* (2013.01); *G06N 3/08* (2013.01)

(58) Field of Classification Search
CPC ........... G06K 9/00013; G06K 9/00067; G06K 9/6262; G06N 3/04; G06N 3/08
See application file for complete search history.

(56) References Cited

U.S. PATENT DOCUMENTS

| 10,133,936 | B2* | 11/2018 | Hu | G01J 5/026 |
|---|---|---|---|---|
| 10,437,974 | B2* | 10/2019 | He | G06F 3/0412 |
| 10,733,413 | B2* | 8/2020 | Nilsson | G06F 3/042 |
| 2016/0148034 | A1* | 5/2016 | Kremin | G06K 9/00033 382/124 |
| 2019/0102595 | A1* | 4/2019 | Lee | G06K 9/00067 |

* cited by examiner

*Primary Examiner* — Utpal D Shah

(57) ABSTRACT

A biometric analysis structure, method and neural network with coded mask are provided. The biometric analysis structure includes a display panel, a light source, and a sensor. The sensor is disposed on the optical path of light from the light source and reflected by the display panel. The biometric analysis structure includes an coded mask. The coded mask is disposed on the optical path in front of the sensor. the coded mask is represented as a first matrix in a matrix form and the first matrix is a delta function after satisfying an autocorrelation operation. The resulting image can be inversely resolved based on the image of the coded mask. Thus, the security of the fingerprint recognition method is improved, and the thickness of the entire imaging structure is reduced.

12 Claims, 8 Drawing Sheets

BIOMETRIC ANALYSIS STRUCTURE, METHOD AND NEURAL NETWORK WITH CODED MASK

FIELD OF THE DISCLOSURE

The invention relates to the technical field of biometric recognition, and in particular to a novel design of structure of optical imaging of a biometric with an coded mask.

BACKGROUND OF THE INVENTION

With the development of information technology, biometric recognition technology is playing an increasingly important role in ensuring information security. Fingerprint recognition has become one of the key technical means for identity recognition and device unlocking widely used in the mobile Internet field. With the increasing screen ratio of devices, traditional capacitive fingerprint recognition is no longer sufficient. Ultrasound fingerprint recognition has problems such as technical maturity and cost. Optical fingerprint recognition is expected to become the mainstream technical solution for fingerprint recognition under the screen.

The existing optical fingerprint recognition scheme is that the light from the OLED is totally reflected by the screen and then directly received by the optical sensor, and the received picture is analyzed and processed. First of all, it may bring security problems. Whether the whole fingerprint image or a part of the fingerprint image is directly carried with fingerprint information, it is easy to be stolen by people with ulterior motives. Secondly, for the increasingly thin handheld devices, the imaging method with the lens also has a dilemma in focus and device design thickness.

In view of optical principle, if a piece of white paper is placed in a natural environment, there will be no image on it. In other words, there are countless multiple images on it, and the light reflected by all external objects is incident on the white paper from all angles, so the white paper seems white. In order to form an image that can be viewed, some incident light needs to be intensified. One method is to use a lens. Light at a specific distance can be focused by the lens to a point at another specific distance, while light at other distances cannot be focused. Light at other distances cannot be focused and does not affect observation when it is scattered in space. A piece of white paper at a certain distance can naturally show the light and shadow of a candle. This is the content of physics experiments in junior high school, and is widely used in today's cameras, video cameras and other optical equipment. Another method is the imaging by using pinhole. The white paper in the dark room can show a clear inverted image, because the pinhole on the wall of the room are equivalent to a filtering device, the countless multiple images that were originally scattered are filtered into only one picture, making the imaging clear. If the number of pinholes increases, the imaging will still become a superposition of multiple pictures and blurred to the naked eye. However, if these pinholes are arranged in a certain regular order, according to the principle of signal and system, the superposition of multiple pictures is regular, and the original picture can be obtained by inverse calculation in a certain way. This method has been disclosed in the academic paper "FlatCam: Thin, Bare-Sensor, Cameras using Coded Aperture and Computation". We are committed to applying this method to the field of biometric imaging under the screen to improve safety.

SUMMARY OF THE INVENTION

Therefore, it is necessary to provide an optical obtaining means for coded the incident light before being received by the sensor, so that the image encryption is improved and the thickness of overall imaging structure is reduced.

In order to achieve the above object, a biometric analysis structure with coded mask is provided. The biometric analysis structure includes a display panel, a light source, a sensor, and an coded mask. The coded mask is configured to filter light being reflected by the display panel, and the sensor is configured to receive a photosensitive image filtered by the coded mask.

In some embodiment, the coded mask is represented as a first matrix in a matrix form and the first matrix is a delta function after satisfying an autocorrelation operation. A biometric image is obtained from inverse calculation of the photosensitive image by using the first matrix.

In some embodiment, a storage unit and a processing unit are further included. The storage unit is configured to obtain a photosensitive image received by the sensor and pre-store the first matrix corresponding to the coded mask, and the processing unit is configured to inversely calculate the biometric image according to the photosensitive image and the first matrix.

In some embodiment, the storage unit and the processing unit are disposed in the terminal device in which the biometric analysis structure is placed.

In some embodiment, the storage unit and the processing unit are disposed on a server.

A biometric analysis method with coded mask is also provided. The method includes training a neural network by training samples to obtain a trained neural network. The training samples are photosensitive images of biometrics filtered by the coded mask and output of the neural network is original images of the biometrics corresponding to the photosensitive images of biometrics. The coded mask is the coded mask of biometric analysis structure with coded mask described above.

In some embodiment, the method further includes inputting the photosensitive image of fingerprint filtered by the coded mask into the neural network to obtain a feature value output from a feature value layer in the neural network.

In some embodiment, the neural network includes a convolutional layer, a fully connected layer, a feature value layer, and a deconvolution layer. The convolutional layer is connected to the fully connected layer, the fully connected layer is connected to the feature value layer, and the feature value layer is connected to the deconvolution layer.

In some embodiment, the convolution layer, the fully connected layer, and the deconvolution layer all comprise two layers. The convolution layer includes a first convolution layer and a second convolution layer. The fully connected layer includes a first fully connected layer and a second fully connected layer. The first convolution layer, the second convolution layer, the first fully connected layer, the feature value layer, the second fully connected layer, the first deconvolution layer, and the second deconvolution layer are connected in sequence.

In some embodiment, the size of the convolution kernel of the first convolution layer is 5×5, the step size of the first convolution layer is 2, and the number of feature maps of the first convolution layer is 64.

In some embodiment, the method further includes storing feature values corresponding to biometric patterns in a biometric pattern library.

In some embodiment, the method further includes comparing feature values outputted by the neural network with the feature values in the biometric pattern library.

A biometric analysis neural network with coded mask is also provided. The neural network includes a convolutional layer, a connected layer, and a feature value layer; connecting weights between the convolution layer, the connected layer, and the feature value layer are determined by establishing the neural network and training the neural network by training samples until completion. The inputted training samples are photosensitive images of biometrics filtered by coded mask, and the output is biometric original images corresponding to the photosensitive images of biometrics. The coded mask is the coded mask of biometric analysis structure with coded mask described above.

In some embodiment, the biometric analysis neural network further includes a deconvolution layer.

Compared to the prior art, the above-mentioned technical solution can use an coded mask to filter the light incident on the sensor, and the resulting image can be inversely resolved based on the image of the coded mask, and the imaging cannot be cracked when the coded mask is unknown. Thus, the security of the fingerprint recognition method is improved. At the same time the thickness of the entire imaging structure is reduced due to using no lens for imaging.

DESCRIPTION OF THE PREFERRED EMBODIMENTS

Figure 1:
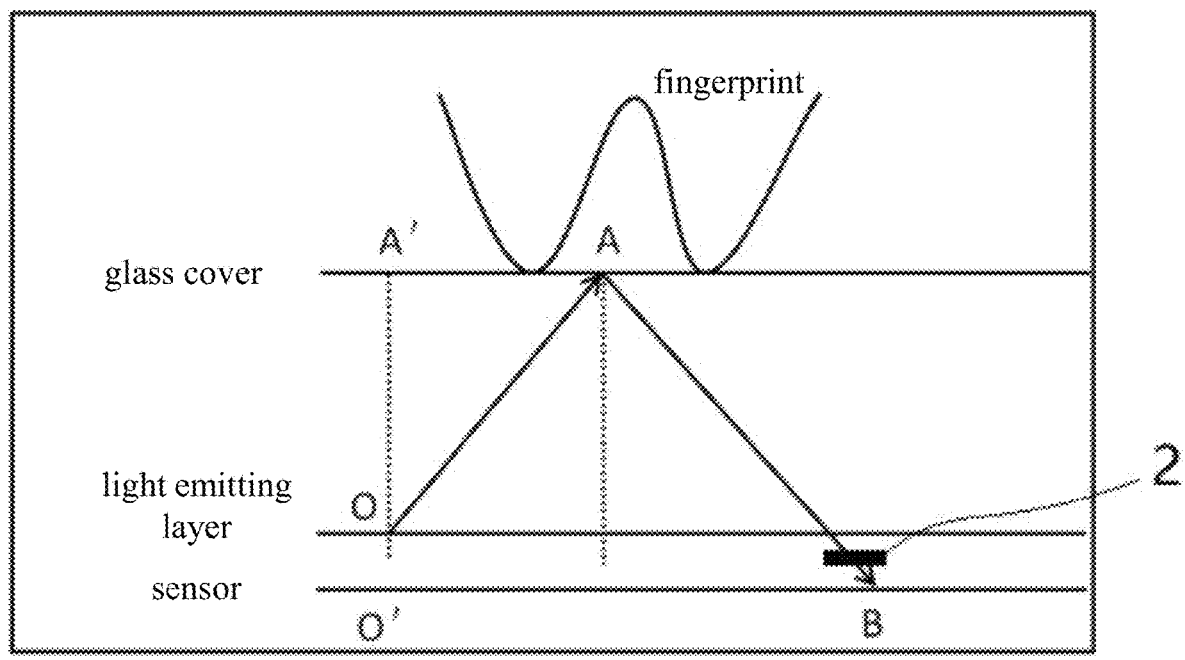
FIG. 1 is a schematic structural diagram of a biometric scanning unit under the screen according to an embodiment of the present invention.

Technical contents, structural features, implemented objectives and effects of the present invention will be described in detail below in combination with embodiments and with reference to the accompanying drawings. The purpose of this technical invention is achieved by the following technical solutions:

As shown in FIG. 1 which is a schematic structural diagram of a biometric scanning unit under the screen in some embodiments of the present invention. The biometric scanning unit may include a light emitting component and a photosensitive component. The light emitting component is disposed in a light emitting layer shown in the figure, and the photosensitive component is such as disposed in a photosensitive layer. Specific settings can be found in our other related patent applications. The light emitted by the light emitting component, after total reflection, can form an image in the photosensitive component in the photosensitive layer under the screen. The screen here is such as the commonly used touch screen. Taking the common touch screen of mobile phones as an example, it is such as 4.7-inch screen, 5.1-inch screen, 5.4-inch screen, etc. By arranging multiple biometric scanning units, we aim to obtain scanned data through the above biometric scanning units in any part of the screen, but without consuming too much energy. The biometric here is such as fingerprints, but if the fingerprints are replaced with other biometric pattern such as palm prints, foot prints, toe prints, retinas, and iris, it is also clear enough for a person having ordinary skill in the art to achieve.

In some embodiment, in order to improve the security of the intermediate image of fingerprint recognition, a biometric recognition structure with a coded mask under the screen is provided. The biometric recognition structure includes a display panel, a light source, and a sensor, which is similar but slightly different to the aforementioned touch screen, light emitting component, and photosensitive component. Our light source and sensor can be corresponding to each other one by one, following the design concept of partial fingerprint imaging. Or, the image is formed after the entire fingerprint is illuminated by multiple light sources. Or, the image is formed after the light from the light source is totally reflected by the display panel.

In some embodiment, the sensor is at the extreme end of the optical path, and an coded mask 2 is also disposed in front of the sensor. The coded mask is disposed on the optical path in front of the sensor, and the coded mask is represented as a first matrix in matrix form. The first matrix is a delta function after satisfying an autocorrelation operation.

Figure 2:
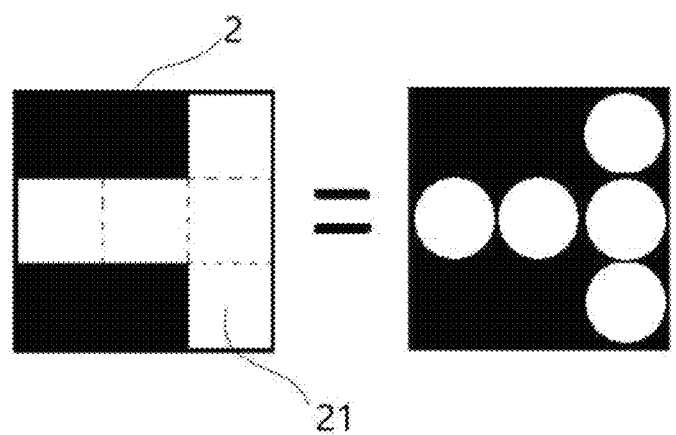
FIG. 2 is a design type of the coded mask according to an embodiment of the present invention.

In a specific embodiment, FIG. 2 show a design type of the coded mask 2. The matrixing of the coded mask can be understood as projecting the two-dimensional structure of the coded mask and dividing it into several horizontal and vertical equal blocks. The coded mask is a two-dimensional plane with a mixture of light-shielding and light-transmitting parts. Then the matrixing of the coded mask can be understood as minimizing the coded mask to the coded unit 21, and the coded unit has two attributes of light shielding and light transmitting. For example, in the embodiment shown in FIG. 2, when it is matrixed, it can be represented by 0 and 1, respectively, and the coded mask can be matrixed, so that the light-shielding part and the light-transmitting part thereon satisfy the relationship of row alignment and column alignment. Each minimized coded unit is usually a regular rectangle, but it can also be stretched in the length or width direction. The coded unit constituting the light-transmitting part may be all light-transmitting or partially hollowed out.

In the example shown in FIG. 2, the coded unit may be only partially transparent. In the coded mask on the right, each mask unit can only transmit light in a circular part, and the circle can be replaced with any shape in the coded unit. As long as it conforms to the alignment of the rows and columns in the entire coded mask, partially transparency does not affect the expression of information on the small scale of the coded mask. The encoded mask in the example shown in FIG. 2 can be matrixed as $$\begin{Bmatrix} 0 & 0 & 1 \\ 1 & 1 & 1 \\ 0 & 0 & 1 \end{Bmatrix}$$

After matrixing the entire coded mask in coded units, the matrix should be a delta function after satisfying an autocorrelation operation. Only coded mask that meet the above conditions can be calculated inversely. The specific analysis methods can be found in the prior art. In the present disclosure, a feature of re-encoded of the encoded mask is mainly used. A photosensitive image obtained after the light through the encoded mask is irradiated on the sensor cannot be understood by the naked eye because its image is the sum of multiple light-transmitting parts.

Figure 3:
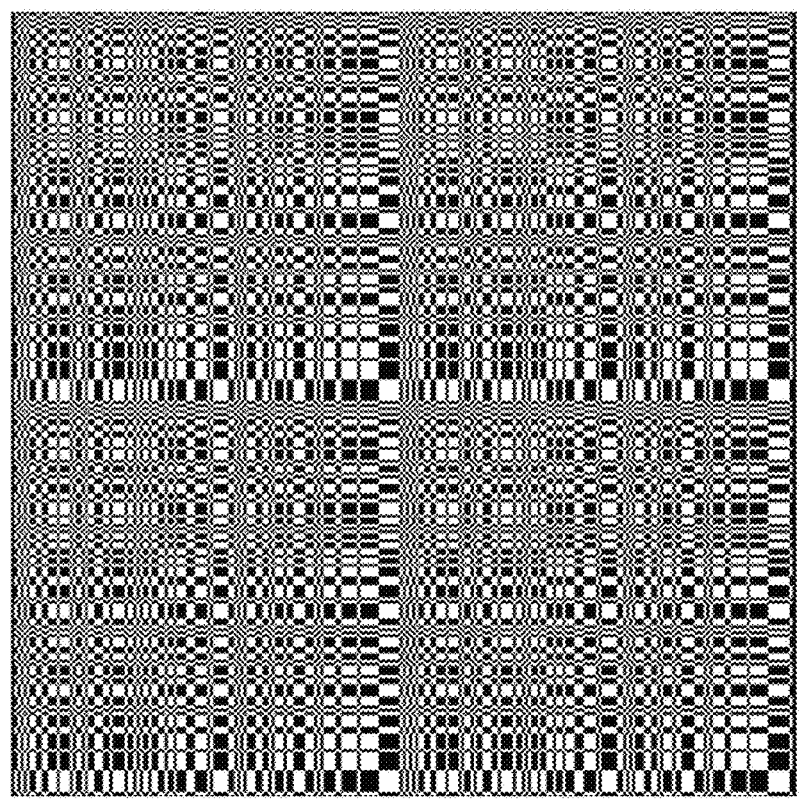
FIG. 3 is a specific coded mask.
Figure 4:
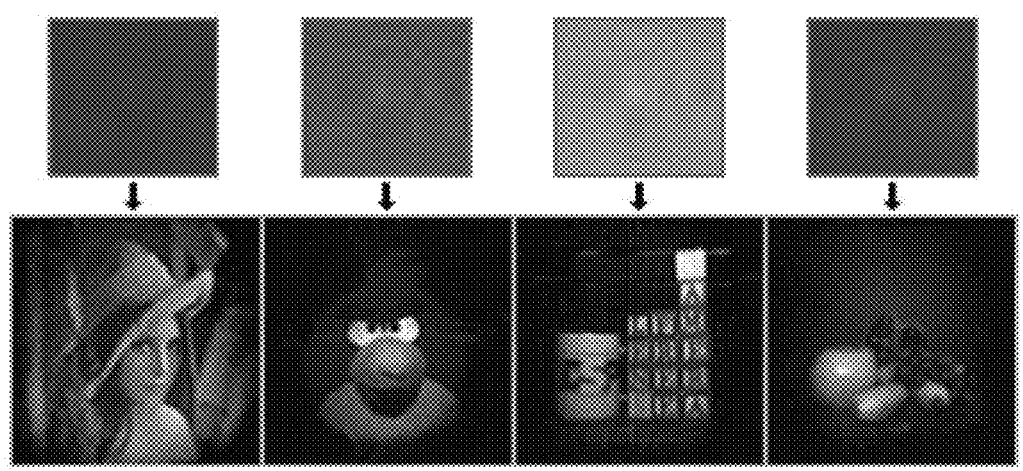
FIG. 4 shows the photosensitive image received by the sensor and the original image according to an embodiment of the present invention.

An example shown in FIG. 3 shows a specific and s available coded mask. In the example shown in FIG. 4, the correspondence between the photosensitive image via the coded mask and the original image is shown. The image captured by the sensor is very blurred and the naked eye cannot distinguish the information in it. Only by performing inverse calculation of information of the first matrix corresponding to the coded mask, can the original image of the biometric be obtained. Through the above-mentioned disclosure, the effect of encrypting fingerprint information is achieved, the security of fingerprint information entry is improved, and the leakage of fingerprint information is prevented.

In some other specific embodiments, the shielding-to-light transmission ratio of the coded mask is 1. In the coded mask, the number ratio of the coded unit classified as a light-shielding part to the light-transmitting part is 1:1. In our embodiment, the image resolving ratio and the signal-to-noise ratio are relatively good while the shielding-to-light transmission ratio is between 35:65 to 65:35. In a preferred embodiment, the shielding-to-light transmission ratio are 50:50, and the advantage of this design is that the final image has the best signal-to-noise performance. In other preferred embodiments, the distance between the coded mask and the sensor is set between 30-100 sensor pixel widths. The advantage of this distance setting method is that it has relatively good information retention. The imaging information on the sensor that is too far away will be blurred and vulnerable to interference. The signal-to-noise ratio will be reduced. If it is too close, it will be disturbed by the diffracted image and the signal-to-noise ratio will also be reduced. We propose a design of structure based on the pixel width of the sensor to better ensure image quality.

Figure 5:
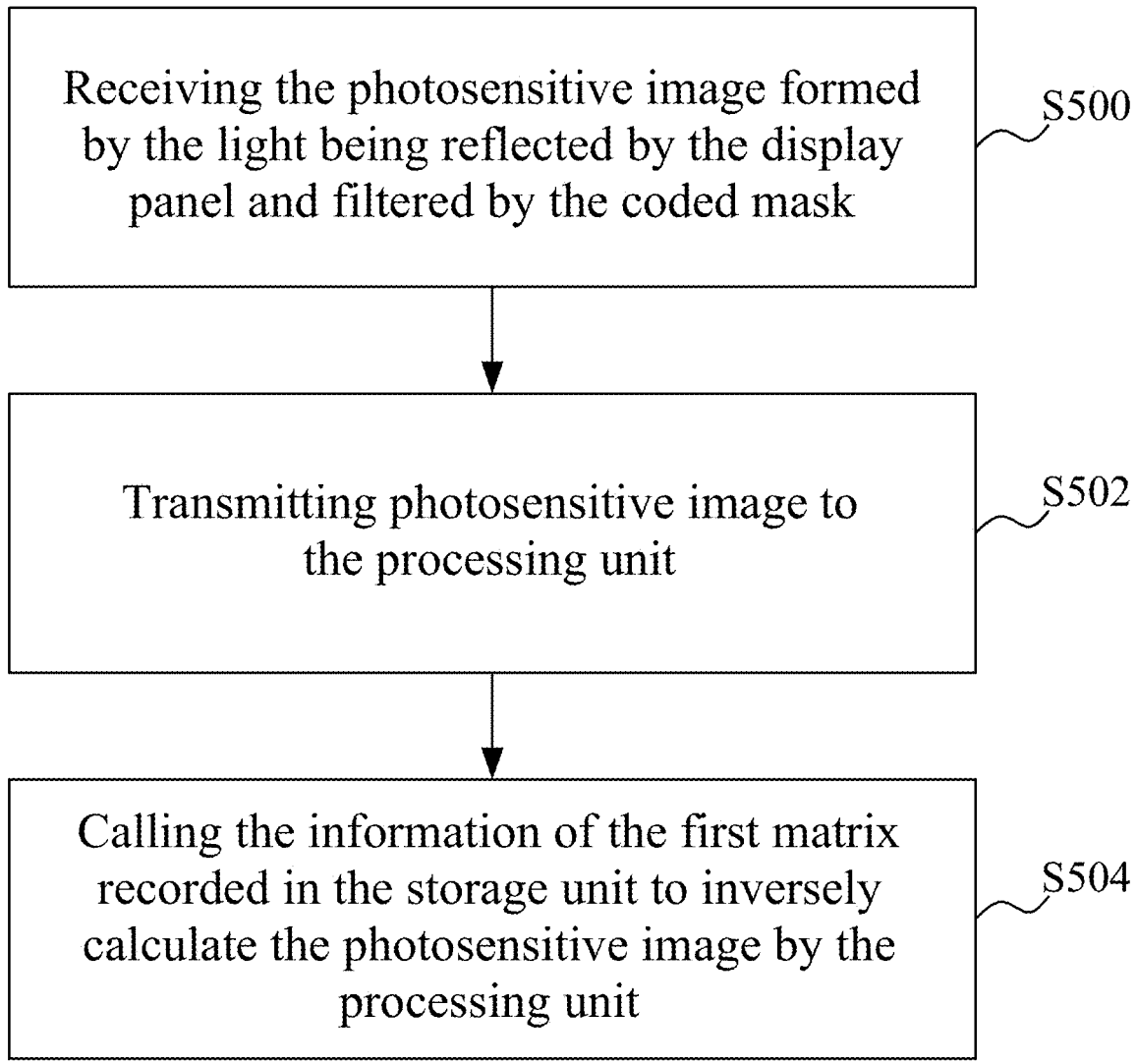
FIG. 5 is a flowchart of a biometric recognition method under the screen according to an embodiment of the present invention.

In order to better improve the security of the overall scheme of biometric recognition, we also provide a biometric recognition system with coded mask under the screen. The system includes the above recognition structure and also includes a storage unit and a processing unit. The storage unit is configured to obtain a photosensitive image received by the sensor and pre-store the first matrix corresponding to the coded mask. The processing unit is configured to inversely calculate the biometric image according to the photosensitive image and the first matrix. Based on the above disclosure, the biometric recognition structure can be integrated in a terminal device having a display panel. In some embodiment, the storage unit and the processing unit are such as integrated in the terminal device or placed in a cloud server. The cloud server can not only inversely calculate but also verify the photosensitive image, to better complete the biometric recognition. Through cloud verification, the security performance of the present disclosure can be further improved because the first matrix that functions as a password need not be stored on the local terminal device. In a specific embodiment, as shown in the flowchart in FIG. 5, the biometric recognition system under the screen performs the following steps:

S500 The sensor under the screen receives the photosensitive image formed by the light being reflected by the display panel and filtered by the coded mask.

S502 The photosensitive image is transmitted to the processing unit.

S504 The processing unit calls the information of the first matrix recorded in the storage unit to inversely calculate the photosensitive image.

Finally, a biometric image information is obtained.

In other embodiments, the biometric recognition structure is relatively small and is only designed to recognize a part of the biometric image, the biometric recognition system under the screen performs the following steps:

S500 The sensor under the screen receives the photosensitive image formed by the light being reflected by the display panel and filtered by the coded mask.

S502 The photosensitive image is transmitted to the processing unit.

S504 The processing unit calls the information of the first matrix recorded in the storage unit to inversely calculate the photosensitive image.

Finally, the part of the biometric image information is obtained.

At the same time, because the biometric recognition structure is relatively small and multiple above-mentioned structures work together, we can design the coded masks in the multiple structures to be different from each other. Thus, at the same time a second biometric recognition system under the screen performs the following steps:

S500 A second sensor under the screen receives the photosensitive image formed by the light being reflected by the display panel and filtered by the coded mask.

S502 The photosensitive image is transmitted to the processing unit.

S504 The processing unit calls the information of second matrix recorded in the storage unit to inversely calculate the photosensitive image.

Finally, second part of the biometric image information is obtained.

Figure 6:
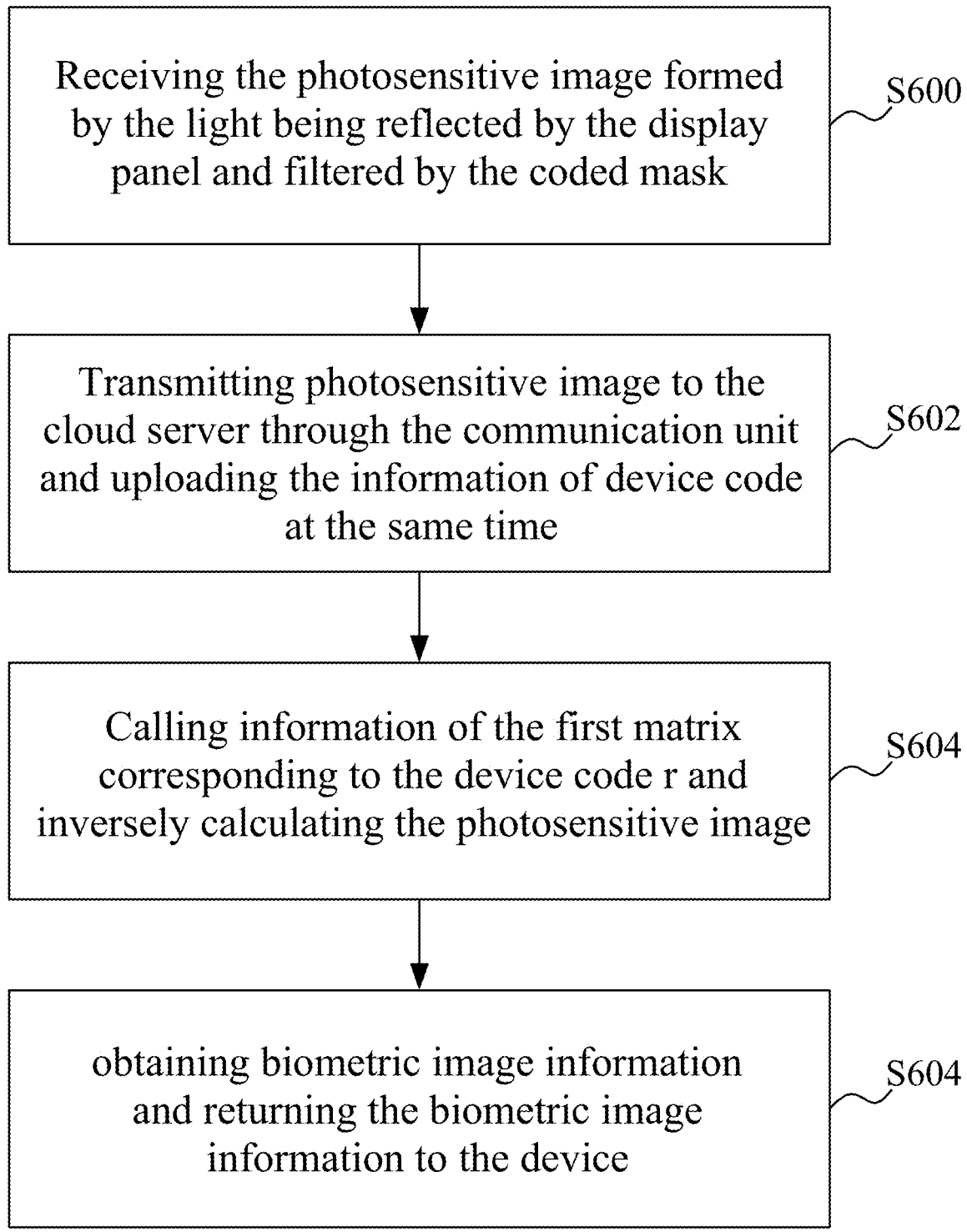
FIG. 6 is a flowchart of a biometric recognition method under the screen according to an embodiment of the present invention.

In some other embodiments, as shown in FIG. 6, the storage unit and the processing unit are located in the cloud. The bio-device terminal also includes the biometric recognition system under the screen to perform the following steps:

S600 The sensor under the screen receives the photosensitive image formed by the light being reflected by the display panel and filtered by the coded mask.

S602 The photosensitive image is transmitted to the cloud server through the communication unit, and the information of device code is also upload at the same time.

S604 The processing unit of the cloud server calls information of the first matrix corresponding to the device code recorded in the storage unit of the cloud server, and inversely calculate the photosensitive image.

S606 Finally, biometric image information is obtained, and the biometric image information is returned to the device.

Figure 7:
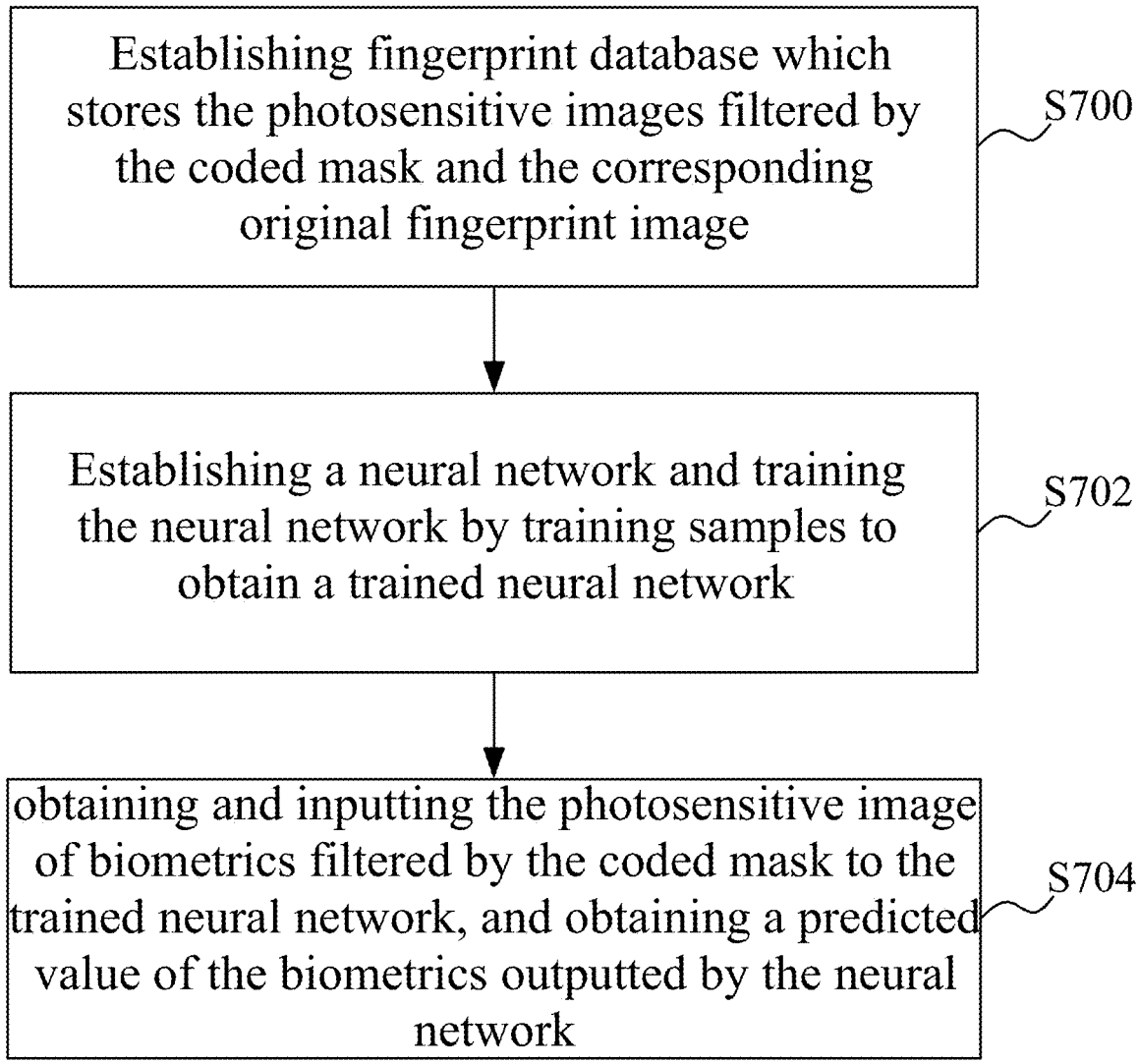
FIG. 7 is a schematic diagram of a biometric reconstruction method with the coded mask according to an embodiment of the present invention.

In the embodiment shown in FIG. 7 which shows a schematic diagram of a biometric reconstruction method with the coded mask. The method starts at step S702 of establishing a neural network and training the neural network by training samples. The inputted training samples are photosensitive images of biometrics filtered by the coded mask, and the output of the neural network is original images of the biometrics corresponding to the biometric images. Thus, a trained neural network is obtained.

S704 The photosensitive image of biometrics that have been filtered by the coded mask is obtained and inputted to the trained neural network, and a predicted value of the biometrics outputted by the neural network is obtained.

In the embodiment, the neural network is configured to process the photosensitive image received by the sensor and filtered by the coded mask in the above-mentioned structure. The neural network can obtain the original image of the biometrics by inverse calculation. The photosensitive image filtered by the coded mask is such as corresponding to the entire fingerprint or a partial fingerprint image obtained by a specific device.

A specific method in some embodiment may be that the photosensitive image filtered by the coded mask and the corresponding original fingerprint image are stored in the fingerprint database in advance. The method of obtaining the original image is to perform inverse calculation based on the matrix information and the principle of signals and systems through the method described above. In the method, the matrix information between the multiple photosensitive images stored in the fingerprint database and the original image may be inconsistent, and this is due to the learning characteristics of the neural network. Therefore, a step S700 can be performed in advance in the method. In the step S700, a fingerprint database is established, and the database stores the photosensitive images filtered by the coded mask and the corresponding original fingerprint image. When the number of such pre-stored original fingerprint images is sufficient, it is convenient for subsequent steps. A neural network architecture is established for image processing, the corresponding photosensitive image of fingerprint filtered by the coded mask is taken as input, and the corresponding original fingerprint image is used as output for training. When the training results are stable, the neural network architecture will be specialized to a neural network that processes the photosensitive images filtered by the coded mask to calculate and obtain the original fingerprint image.

By applying the neural network to the analysis of the photosensitive image of fingerprint filtered by coded mask, the steps of calculation can be simplified, whether it is deduplication, normalization, splicing, etc., all can be converted into the neuron parameters of the neural network. Secondly, the learning characteristics of the neural network can be used, even if some information of fingerprint is missing, the predicted value of the original fingerprint image corresponding to the entire fingerprint can be obtained from the neural network. The more training samples, the more accurate this predicted value will be. The entire fingerprint image reconstructed by the neural network also avoids the leakage of information and improves the security of the existing fingerprint analysis technology.

In some embodiments, we can specifically adjust the structure and corresponding parameters of the neural network. The neural network includes a convolutional layer and a deconvolutional layer that are connected in sequence. In the embodiment, the input of the neural network is some photosensitive images of fingerprints filtered by the coded mask. A convolution result is obtained through the convolution layer and the number of the convolutional layers can be set as needed. After inputting the convolution result into the deconvolution layer, a predicted value of the original fingerprint image corresponding to the photosensitive image of fingerprints filtered by the coded mask is output from the neural network.

Through the above-mentioned architecture design of the neural network, faster analysis of the photosensitive image of fingerprints filtered by the coded mask, good performance on different results expressed by many different coded masks, and strong universality are achieved.

Figure 8:
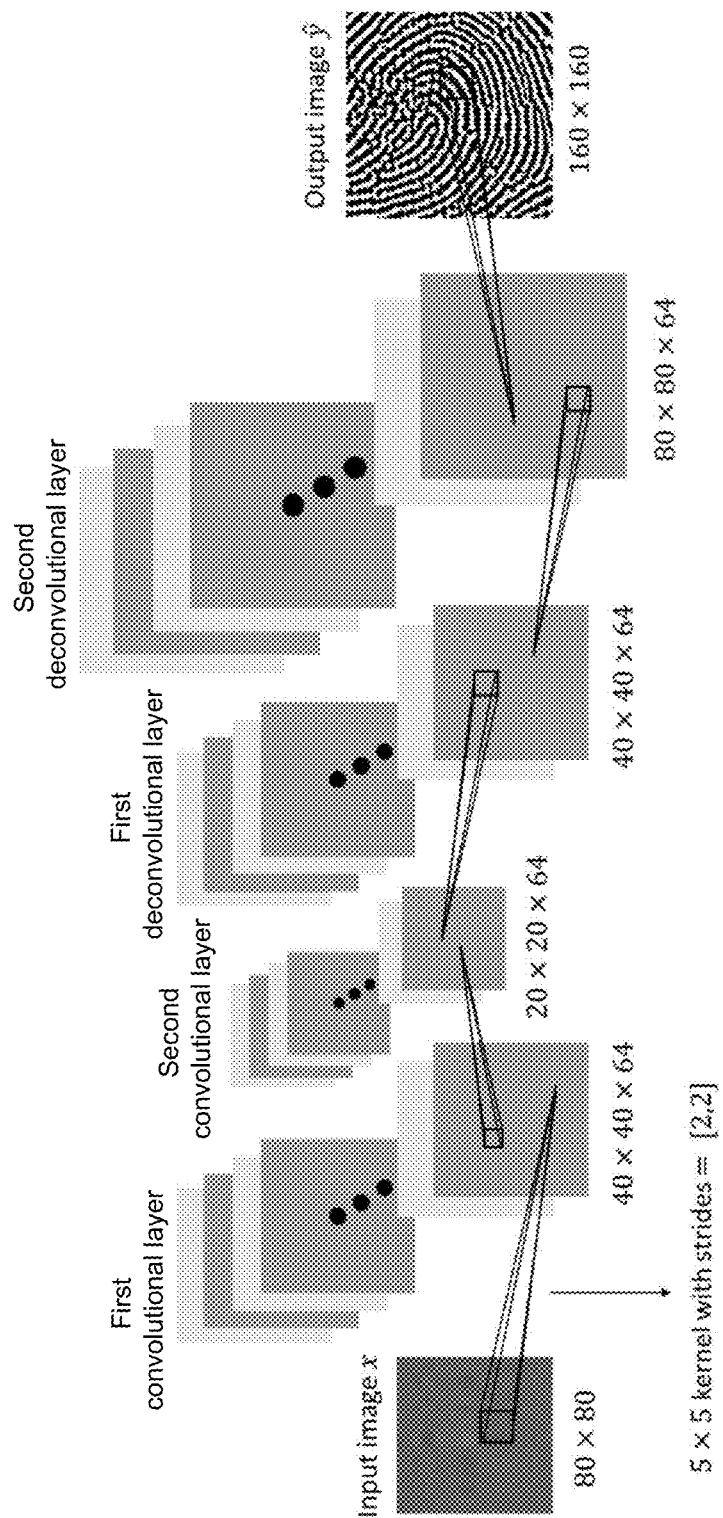
FIG. 8 is a schematic diagram of a biometric neutral network with the coded mask according to an embodiment of the present invention.

In some embodiments as shown in FIG. 8, the neural network includes a first convolutional layer, a second convolutional layer, a first deconvolutional layer, and a second deconvolutional layer that are connected in sequence. The size of the convolution kernel of the first convolution layer is 5×5, the step size of the convolution kernel, i.e. the displacement of each core, is 2, and the number of feature maps is 64. The setting of the second deconvolution layer is corresponding to that of the first convolution layer. The kernel size, step size, and number of feature maps of the second convolution layer can be set to be the same as those of the first convolution layer. The person having ordinary skill in the art can also choose different parameters according to needs. In the embodiment shown in FIG. 2, the size of the inputted photosensitive image of fingerprint filtered by the coded mask is 80*80 pixels, and the result obtained from the first convolution layer is a data of 40*40. This result is then input to the second convolution layer, and a 20*20 secondary convolution result can be obtained. The secondary convolution result is then deconvolved through two deconvolution layers, and the parameters are adjusted to obtain an output of entire fingerprint image of 160*160 size. Through the above design, the fingerprint reconstruction step can be performed better. From a practical perspective, the smaller the size of the convolution kernel, the features extracted by the convolution algorithm is more detailed, but overfitting is more likely to occur, and computing power requirement is higher. The larger the convolution kernel, the rougher the feature extracted, so that the matching result is not accurate enough. The selection of the step size also has the same characteristics. The person having ordinary skill in the art can adjust the size and step size of the convolution kernel as needed.

In other embodiments, the layers of the neural network architecture can be further optimized. A connected layer is such as provided between the second convolution layer and the first deconvolution layer, and the connected layer is used to process the convolution result of the second convolution layer and input the processing result to the first deconvolution layer. The connected layer can have multiple layers, and multiple neurons are placed in each layer. The more layers in the connected layer, the richer the number of neurons in each layer, the more accurate the processing result of the neural network, and the more computing power it consumes. In some embodiments, the first connected layer and the second connected layer are further included, and the number of neurons in each layer is set to 400. By designing multiple connected layers, the processing capacity of the neural network is further improved, the processing efficiency is optimized, and the accuracy of the reconstruction and analysis of the fingerprint is improved. The advantage of reconstructing original image from the filtered photosensitive image by using the neural network is achieved through the above-mentioned method of the present disclosure, the need of hardware resources for inverse calculation is reduced, the universality of fingerprint recognition method is improved, and the security of fingerprint identification method is also improved.

Figure 9:
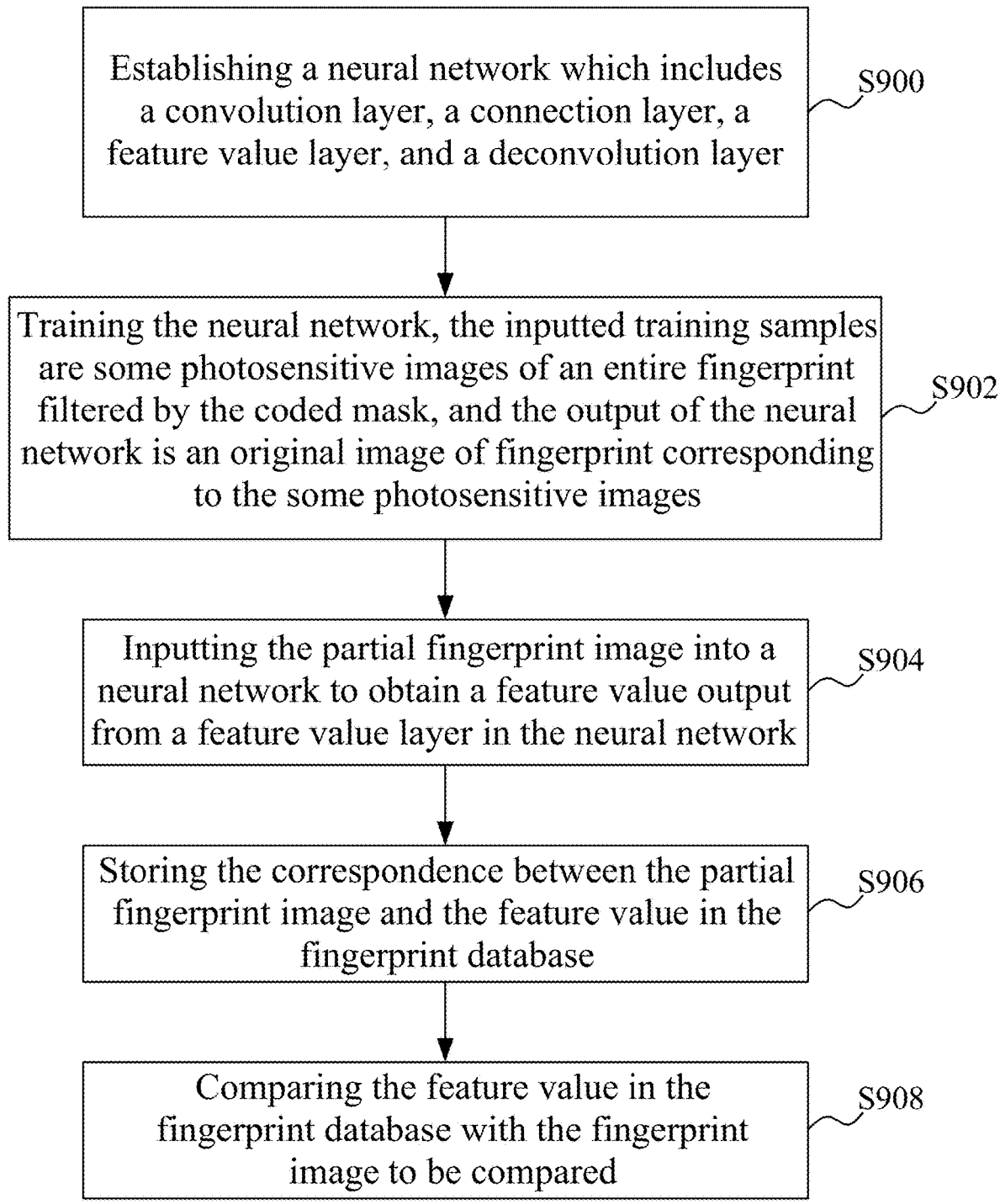
FIG. 9 is a schematic diagram of a biometric analysis method according to an embodiment of the present invention.

In the embodiment shown in FIG. 9, we also provide a method for analyzing biometrics including the following steps. A step S900 of establishing a neural network which includes a convolution layer, a connection layer, a feature value layer, and a deconvolution layer is performed.

In a step S902, the neural network is trained by training samples. The inputted training samples are some photosensitive images of an entire fingerprint filtered by the coded mask, and the output of the neural network is an original image of fingerprint corresponding to the photosensitive images of fingerprints filtered by the coded mask. After training is complete, a trained neural network is obtained. Then, a step S904 is performed to input the photosensitive images of fingerprint filtered by the coded mask into a neural network to obtain a feature value output from a feature value layer in the neural network.

Figure 10:
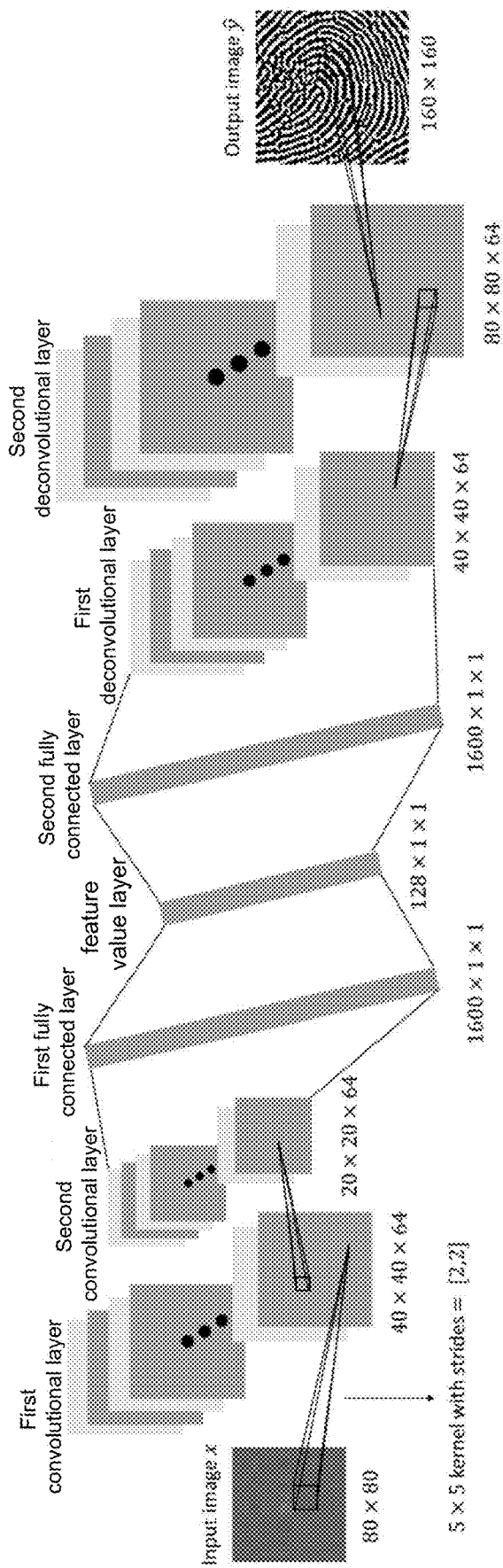
FIG. 10 is a schematic diagram of a biometric analysis neutral network with the coded mask according to an embodiment of the present invention.

FIG. 10 is a neural network for biometric analysis of the present disclosure. In the embodiment, the neural network for biometric analysis includes a first convolutional layer, a second convolutional layer, a first fully connected layer, a feature value layer, a second fully connected layer, a first deconvolution layer, and the second deconvolution layer that are connected in sequence. The specific number of convolution layers, connected layers, and deconvolution layers can be set according to actual needs. By training the neural network in the above-mentioned method, the connected parameters between the feature value layer and the previous layer in the neural network are determined. And the photosensitive image of fingerprint filtered by a specific coded mask can correspond to a specific outputted entire image. Similarly, the output of the feature value layer of the neural network can be specified.

In the embodiment, the number of neurons in the feature value layer is preferably 128. Of course, it can also be selected to be any value such as 32, 64, and 256. When the number of neurons is selected to be 128, the output of the feature value layer is a 128-dimensional vector, which can be used to represent the outputted corresponding original fingerprint image, and it can also represent its corresponding photosensitive image of fingerprint filtered by some coded mask. The more neurons in the feature layer, the more accurate the representation from the feature layer. In the practical application of the trained neural network, it is not necessary to output the final original fingerprint image, only the feature values calculated from the feature value layer to represent the original fingerprint image. By designing a neural network for image processing with a feature value layer, the photosensitive image of the fingerprint filtered by multiple coded masks are technically converted into a code, so the calculation of analyzing and synthesizing multiple photosensitive images of fingerprints filtered by coded masks is avoided. Because the original fingerprint image is not synthesized in the end, data leakage and theft are avoided, and the security of the biometric analysis method is improved.

In order to better meet the needs of biometric analysis, we can store the correspondence between partial images of biometric patterns and feature values obtained by the above-mentioned analysis method in a database. The method further includes the following steps. In a step S906, the fingerprint database stores the correspondence between the photosensitive images of fingerprint filtered by the coded mask and the code. For example, in some embodiment the photosensitive images of fingerprint a1, a2, a3, and a4 belong to the same fingerprint A1, and a1, a2, a3, a4 are inputted into the trained neural network, and d1 from the feature value layer is outputted. The correspondence 【A1, d1】 between the original fingerprint image and the code, the correspondence 【a1, a2, a3, a4, d1】 between the photosensitive images of fingerprint filtered by the coded mask and the code, or the only valid code d1 is stored in the database. Multiple feature values d1, d2, d3 . . . d100, etc. of fingerprints constitute the fingerprint database. When a comparison is needed, a step is performed for comparing the feature values of first fingerprint and second fingerprint obtained from the trained neural network described in the above. In a step S908, the code of the fingerprint image is compared with the feature values stored in the fingerprint database. If the difference between the code of the fingerprint to be compared and the existing code in the database is less than a preset threshold, it is considered that the fingerprint to be compared matches the fingerprint in the database. Here the code of the fingerprint to be compared is obtained by inputting the photosensitive images of fingerprint filtered by some coded masks into the neural network. The calculation method of the difference value can refer to the calculation method of the vector difference value. The preset threshold value can be adjusted according to the actual situation and is preferably 1. Through the above-mentioned method, the fingerprint database is established to store the feature values of the existing fingerprints, and the pattern of new fingerprint is compared with the feature values in the database when the fingerprint verified is needed, and thus the operation of comparison between different fingerprints is realized. The efficiency of fingerprint recognition is further enhanced. In some embodiments as shown in FIG. 10, the size of the convolution kernel is 5×5, the displacement of each core is 2, and the number of feature maps is 64. The number of neurons in the first fully connected layer is 1600, and the number of neurons in the second layer is 6,400. The feature layer has 128 neurons, and its output is the code and can be expressed as a 128-dimensional vector. By calculating the distance between the feature values obtained from different input images, we can perform fingerprint comparison. The input image is set as x, its corresponding full fingerprint image is set as y, and the output of the neural network is set as ŷ. The training goal is to minimize the reconstruction error function $L(y, ŷ)$. The above-mentioned size of the convolution kernel, the step size, number of feature maps, and number of neurons can be changed according to specific needs. The above-mentioned settings can make the neural network perform the calculation in the feature value layer better and faster and improve the robustness.

In the above-mentioned technical solution, by designing a neural network with a feature value layer for image processing, the fingerprint image filtered by the coded mask is technically converted into a code, and the inverse calculation to obtain the original fingerprint image is skipped. Thus, because the synthesis of the entire fingerprint image is not required, data leakage and theft are avoided, and the security of the biometric analysis method is improved.

In some embodiment, a storage medium for biometric analysis with coded mask is provided and stores a computer program. When the computer program is executed, it executes the following steps. A neural network is established and the neural network includes a convolution layer, a connected layer, a feature value layer, and a deconvolution layer.

A neural network is established and the neural network is trained by training samples. The training samples are photosensitive images of biometrics filtered by the coded mask, and the output of the neural network is an original image of the biometrics corresponding to the biometric images. A trained neural network is obtained. After the training is completed, the code of the photosensitive images of biometrics filtered by the coded mask is inputted to the neural network, a code is outputted from the code of the neural network.

In some embodiment, when the computer program is executed, it executes the following steps. Feature values corresponding to biometric patterns are stored in a biometric pattern library.

In some embodiment, when the computer program is executed, it executes the following steps. The code output by the neural network are compared with the feature values in the biometric pattern library.

In some embodiment, the neural network includes a first convolutional layer, a second convolutional layer, a first deconvolutional layer, and a second deconvolutional layer that are connected in sequence.

In some embodiment, a neural network for biometric analysis is provided. The neural network includes a convolution layer, a connected layer, and a feature value layer that are connected in sequence. The connecting weights between the convolution layer, the connected layer, and the feature value layer are determined by the following steps.

The neural network is established and the neural network includes the convolutional layer, the connected layer, the feature value layer, and the deconvolution layer.

The neural network is trained by training samples. The inputted training samples are photosensitive images of biometrics filtered by coded mask, and the output is biometric original images corresponding to the photosensitive images of biometrics.

What is claimed is:

1. A biometric analysis structure with coded mask comprising a display panel, a light source, a sensor, and an coded mask, wherein the coded mask is configured to filter light emitted from the light source and reflected by the display panel, and the sensor is configured to receive a photosensitive image filtered by the coded mask; wherein the biometric analysis structure with coded mask further comprises a processing unit, the processing unit is configured to process the photosensitive image received by the sensor and filtered by the coded mask via a neural network;
wherein the neural network is trained by training samples, the training samples are photosensitive images of biometrics filtered by the coded mask and output of the neural network is original images of the biometrics corresponding to the photosensitive images of biometrics.

2. The biometric analysis structure according to claim 1, wherein the coded mask is represented as a first matrix in a matrix form and the first matrix is a delta function after satisfying an autocorrelation operation, and an original biometric image corresponding to the photosensitive image received by the sensor is obtained from an inverse calculation of the photosensitive image by using the first matrix.

3. The biometric analysis structure according to claim 2, further comprising a storage unit; wherein the storage unit is further configured to obtain the photosensitive image received by the sensor and pre-store the first matrix corresponding to the coded mask, and the processing unit is configured to inversely calculate the original biometric image according to the photosensitive image and the first matrix.

4. A biometric analysis method with coded mask comprising:
training a neural network by training samples to obtain a trained neural network wherein the training samples are photosensitive images of biometrics filtered by a coded mask and output of the neural network is original images of the biometrics corresponding to the photosensitive images of biometrics;
wherein the coded mask is configured to filter light emitted from a light source and reflected by a display panel, and a sensor is configured to receive a photosensitive image filtered by the coded mask.

5. The biometric analysis method with coded mask according to claim 4, further comprising inputting the photosensitive image of fingerprint filtered by the coded mask into the neural network to obtain a feature value output from a feature value layer in the neural network.

6. The biometric analysis method with coded mask according to claim 5, wherein the neural network comprises a convolutional layer, a fully connected layer, the feature value layer, and a deconvolution layer, the convolutional layer is connected to the fully connected layer, the fully connected layer is connected to the feature value layer, and the feature value layer is connected to the deconvolution layer.

7. The biometric analysis method with coded mask according to claim 6, wherein the convolution layer, the fully connected layer, and the deconvolution layer all comprise two layers, the convolution layer comprises a first convolution layer and a second convolution layer, the fully connected layer comprises a first fully connected layer and a second fully connected layer, and the first convolution layer, the second convolution layer, the first fully connected layer, the feature value layer, the second fully connected layer, the first deconvolution layer, and the second deconvolution layer are connected in sequence.

8. The biometric analysis method with coded mask according to claim 6, wherein a size of the convolution kernel of the first convolution layer is 5×5, a step size of the convolution kernel is 2, and the number of feature maps of the first convolution layer is 64.

9. The biometric analysis method with coded mask according to claim 4, further comprising storing feature values corresponding to biometric patterns in a biometric pattern library.

10. The biometric analysis method with coded mask according to claim 4 further comprising comparing feature values outputted by the neural network with the feature values in the biometric pattern library.

11. A biometric analysis neural network system, wherein the neural network comprises a processing circuitry configured to: process a photosensitive image received by a sensor and filtered by a coded mask;
wherein the neural network is trained by training samples until completion, the training samples inputted to the neural network are photosensitive images of biometrics filtered by the coded mask, and output of the neural network is original biometric images corresponding to the photosensitive images of biometrics;
wherein the coded mask is configured to filter light emitted from a light source and reflected by a display panel, and the sensor is configured to receive the photosensitive image filtered by the coded mask.

12. The biometric analysis neural network system according to claim 11 comprising a convolutional layer, a connected layer, and a feature value layer; wherein connecting weights between the convolution layer, the connected layer, and the feature value layer are determined by establishing the neural network.

\* \* \* \* \*